United States Patent [19]

Murakami et al.

[11] Patent Number: 4,893,188
[45] Date of Patent: Jan. 9, 1990

[54] DOCUMENT IMAGE ENTRY SYSTEM

[75] Inventors: Tatsuya Murakami, Tachikawa; Hiromichi Fujisawa, Tokyo; Masaaki Fujinawa, Tokorozawa; Toshihiro Hananoi, Kanagawa, all of Japan

[73] Assignee: Hitachi, Ltd., Tokyo, Japan

[21] Appl. No.: 208,116

[22] Filed: Jun. 17, 1988

[30] Foreign Application Priority Data

Jun. 19, 1987 [JP] Japan .................... 62-151108

[51] Int. Cl.⁴ .................... H04N 1/40
[52] U.S. Cl. .................... 358/456; 358/443; 358/464; 382/9
[58] Field of Search ........... 358/283, 282, 284, 280; 382/9, 50

[56] References Cited

U.S. PATENT DOCUMENTS

| | | | |
|---|---|---|---|
| 4,437,122 | 3/1984 | Walsh et al. | 358/284 |
| 4,547,811 | 10/1985 | Ochi et al. | 358/283 |
| 4,646,134 | 2/1987 | Komatsu et al. | 382/9 |
| 4,722,008 | 1/1988 | Ibaraki et al. | 358/283 |
| 4,729,035 | 3/1988 | Tanioka | 358/283 |
| 4,741,046 | 4/1988 | Matsunawa et al. | 358/283 |
| 4,742,400 | 5/1988 | Tsuji | 358/284 |
| 4,750,044 | 6/1988 | Nakajima | 358/283 |
| 4,751,585 | 6/1988 | Shibazaki | 358/282 |
| 4,782,399 | 11/1988 | Sato | 358/283 |

FOREIGN PATENT DOCUMENTS

| | | |
|---|---|---|
| 58-3374 | 10/1983 | Japan . |
| 60-196068 | 10/1985 | Japan . |
| 61-3568 | 9/1986 | Japan . |

OTHER PUBLICATIONS

"Auto-Adaptive Image Processing for Character and Half Tone Image", Muramatsu et al, Journal of Institute of Image Electronic of JP, vol. 15, No. 4, 1986, pp. 265-272.

"A Quasi-Tone Reproduction Method Without Reducing Character Image Quality", Tetsutani et al, Technical Research Report of the Institute of Electronic & Communication Engineers of Japan.

*Primary Examiner*—Howard W. Britton
*Assistant Examiner*—Kim Yen Vu
*Attorney, Agent, or Firm*—Antonelli, Terry & Wands

[57] ABSTRACT

For halftone digital image data, an edge portion of the image is extracted for each pixel, and based on a density of each pixel or an average density of each group of a plurality of adjacent or neighboring pixels, there are extracted pixels of a background other than the edge portion of the image. Thereafter, the image data is subdivided into a plurality of blocks each including a predetermined number of pixels. Based on distribution states of the pixels of the block judged to belong to the edge and those of the block judged to belong to the background, a domain recognition is conducted to determine whether the block is a binary block or a halftone block. In addition, for each block, a state of areas in blocks encircling the block is examined such that depending on the state, an expansion/contraction processing is repeatedly achieved a predetermined times for the halftone domain, thereby separating the image data into a binary domain and a halftone domain in a real-time fashion.

16 Claims, 15 Drawing Sheets

FIG. 13

| J (p-1,q) | J (p,q-1) | J (p,q+1) | J (p+1,q) | K (p,q) |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 0 |
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

FIG. 14

| J (p-1,q) | J (p,q-1) | J (p,q+1) | J (p+1,q) | K (p,q) |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 1 |
| 1 | 0 | 0 | 0 | 0 |
| 1 | 0 | 0 | 1 | 1 |
| 1 | 0 | 1 | 0 | 0 |
| 1 | 0 | 1 | 1 | 1 |
| 1 | 1 | 0 | 0 | 0 |
| 1 | 1 | 0 | 1 | 1 |
| 1 | 1 | 1 | 0 | 1 |
| 1 | 1 | 1 | 1 | 1 |

FIG. 15a

| X | O | X |
|---|---|---|
| O | ////  | O |
| X | O | X |

FIG. 15b

| X | O | X |
|---|---|---|
| O | //// | O |
| X | 1 | X |

FIG. 15c

| X | 1 | X |
|---|---|---|
| O | //// | O |
| X | 1 | X |

FIG. 15d

| X | O | X |
|---|---|---|
| O | //// | 1 |
| X | 1 | X |

FIG. 15e

| X | 1 | X |
|---|---|---|
| O | //// | 1 |
| X | 1 | X |

FIG. 15f

| X | 1 | X |
|---|---|---|
| 1 | //// | 1 |
| X | 1 | X |

DOCUMENT IMAGE ENTRY SYSTEM

BACKGROUND OF THE INVENTION

The present invention relates to a method of inputting a document image, and in particular, to an image input apparatus having a function in which in a case where a document image including a character area and a photograph area therein is to be represented in a binary notation through a binarization, an operation to judge whether or not a portion of the image requires a dither process is achieved in a real-time fashion so as to effect an appropriate processing.

Conventionally, for an apparatus which determines in a real-time fashion whether a portion of a document image belongs to an area (to be referred to as a halftone domain herebelow) requiring a dither process or to an area (to be referred to as a binary domain herebelow) not requiring the dither processing, there has been proposed a method in which the image is subdivided into small parts each called a mesh comprising 3×3 pixels, 5×5 pixels, or the like so as to attain a characteristic quantity from the density of an internal portion of the mesh, thereby determining the area depending on the value of the characteristic quantity.

Incidentally, the operation to determine whether a portion of an image belongs to a halftone domain or to a binary domain is to be called a domain decision or recognition herebelow.

As a conventional example, in the conventional example 1 (JP-A-58-3374), there has been described a method in which the density difference between the maximum value and the minimum value of density of the pixels in a mesh is assigned as a characteristic quantity for the mesh.

In this method, it is assumed that a portion of which the density difference is equal to or more than a predetermined value belongs to the binary domain and that a portion of which the density difference is below the predetermined value belongs to the halftone domain, thereby accomplishing the domain decision or recognition for each mesh. In addition, there has been described a method in which after the domain recognition is carried out depending on the density difference; thereafter depending on the recognition results of meshes located in the periphery thereof, the recognition result of each mesh is rewritten, thereby attaining the final result of the domain recognition. Incidentally, the operation to rewrite a recognition result once obtained, as described above, according to the situation of the periphery is to be called a rewriting process herebelow.

In the conventional example 1, attention has been given to a fact that the density greatly varies in an edge portion or a contour portion of a character.

However, only the edge portion of the character is regarded as the binary domain according to this method, namely, the other portions are judged to belong to the halftone domain. As a result, this method cannot be applied to a purpose in which a document image is to be separated into binary and halftone domains.

In addition, according to a conventional example 2 (JP-A-60-196068), there has been proposed a method in which a binarization of an image is effected depending on two kinds of threshold values so as to generate two binary images such that a difference between the binary images is attained for each mesh, thereby producing a characteristic quantity. In this method, a portion of the image is regarded as a binary domain if the characteristic quantity is less than threshold level; otherwise, the portion is considered to be a halftone domain. In addition, the rewriting process is further accomplished in the same fashion as the conventional example 1.

In this method, it is assumed that the pixels of the binary domain possess only the density associated with white or black and that those of the halftone domain have the grey density.

However, a photograph area belonging to the halftone domain also includes a pure white portion or a pure black portion, whereas also in the binary domain, the density of pixels on an edge portion of a character may take a halftone level. Furthermore, since a character written by use of a pencil has a thin color, the density thereof becomes to take an intermediate value. Consequently, according to this method, the recognition accuracy or precision is low for for an image including the character written in a thin color and the photograph area having a high contrast.

On the other hand, according to a conventional example 3 (JP-A-61-3568), there has been described a method in which an image is subdivided into blocks each comprising a plurality of pixels. For each block, there is counted the number of pixels for which the density difference with respect to the neighboring pixel is equal to or more than a particular value. If the number is not below a predetermined value, the entire block is assumed to be a binary domain; otherwise, the block is recognized to be a halftone domain.

However, even in a photograph area, the change in the density is great, for example, in an edge portion of an object. Moreover, also in a character area, since for a document written by use of a pencil, the color of characters is thin and the contour or edge thereof becomes to be obscure, the change in the density is small even in the edge portion. As a result, the recognition precision of this method is reduced for an image including the character and photograph areas above.

In the prior art technology, according to the methods of the conventional examples 1 and 2 in which the domain recognition is conducted for each mesh, only quite local data such as 3×3 pixels are used for the domain recognition. However, in general, since the individual pixel is of a small size, the mesh occupies a very small area.

For example, in an image associated with a resolution of 200 dots/inch (8 lines/mm) generally adopted in a facsimile apparatus, the area occupied by a mesh including 3×3 pixels is at most 0.4×0.4 mm². In a high-precision image with a resolution of 400 dots/inch, the area is at most 0.2×0.2 mm². It is difficult to appropriately recognize, only from the data of this range, whether the portion belongs to the binary domain or to the halftone domain.

However, in order to attain a large mesh area, if the number of pixels is merely increased for each mesh, the processing is only complicated and recognition precision cannot be improved.

For example, in the method of the conventional example 1 where the domain recognition is achieved depending on the density difference in a mesh, both in the binary domain and in the halftone domain, the maximum value of the density difference in a mesh increases as the mesh area becomes greater. As a result, the difference between characteristic quantities adopted to discriminate the binary domain from the halftone domain becomes to be smaller.

In addition, according to the method of the conventional example 2 where a comparison is effected on the binary results attained through a binarization based on two kinds of threshold values, as the mesh area increased, the difference between the two binary images becomes greater regardless of the areas.

However, in a case of a small mesh, conditions of many meshes are required to be referenced in order to effect the rewriting process.

For example, let us consider a case where the domain recognition is carried out on an image sampled with a resolution of 200 dots/inch (8 lines/mm) by use of meshes each including 3×3 pixels. In this situation, only to reference the state of the periphery of 3×3 mm of the mesh, it is required to examine 64 meshes. However, there exist $2^{64}$ kinds of recognition results for the examination of the 64 meshes. In consequence, a high-speed processing, particularly, a real-time processing cannot be easily achieved.

In contrast thereto, according to the conventional example 3, the state of a large region can be referenced without increasing the processing amount.

However, when only the density difference between pixels is adopted as the characteristic quantity, merely the edge portion of a line graphic image like a character can be extracted as described above.

Consequently, in order to separate the area according to this method, it is necessary to rewrite the periphery of a block assumed to be a binary domain into a binary domain in a large range.

The processing above is to be called an expansion processing of a binary domain herebelow. However, as described above, the halftone domain also includes a portion where the density abruptly changes. FIG. 3a shows an example of the domain recognition result in such a case. In this figure, reference numeral 10 denotes a portion judged to be an edge portion of a character according to the edge extract processing, whereas reference numeral 20 indicates a portion which is, although actually a portion of the photograph, recognized to be an edge portion of a character. The hatched portions (such as the portions 10 and 20) are those recognized to belong to the binary domain. In addition, a square part 30 enclosed with bold frame lines is an area to be regarded as a halftone domain, for example, of a photograph. In the situation of FIG. 3a, it is difficult to discriminate the edge portion 10 of the pattern from the portion which is, although actually an area to be regarded as a halftone domain, recognized to be a binary domain.

In order to overcome this difficulty, the expansion processing of the binary domain is conducted on the state of FIG. 3a, thereby attaining a result of FIG. 3b. Here, reference numeral 11 designates a portion obtained by expanding the portion 10 of FIG. 3a, whereas reference numeral 21 results from the expansion effected on the portion 20 of FIG. 3a. That is, the region of the hatched portion 11 is recognized to be a binary domain, and at the same time, the region 20 mistakenly regarded as a binary domain is also expanded such that the range of the hatched portion 21 is recognized to be a binary domain.

In addition, as shown in FIG. 3a, a halftone domain 30 is contained in a binary domain in many cases. In this case, however, the pattern is seldom located so as to extend in the entire region of the binary domain. Consequently, even when an expansion processing is carried out on the edge portion 10, the overall region of the binary domain cannot be recognized to be a binary domain.

The area can be separated by use of the expansion of an edge portion only in a case where, for example, a binary domain 40 exists in a portion of a halftone domain 31 and the pattern is drawn in the entire region thereof as shown in FIG. 3c.

In this method, the rewriting process is accomplished through at least two stages of processing. However, the processing of each stage is required to be repeatedly achieved until the recognition result becomes to be fixed in the entire image.

In consequence, the final result of the domain recognition is attained only after the data associated with the overall image is inputted. That is, for example, in a case where a binary domain of an image is binarized by use of a fixed threshold value and a halftone domain thereof is subjected to a dither process, two kinds of binary images are required to be kept stored until the domain recognition is finished, which necessitates a memory of a large capacity.

SUMMARY OF THE INVENTION

It is therefore an object of the present invention to provide an image entry apparatus in which also for a document image including characters of a document with a low contrast written by a pencil and a photograph with a great density change, an image area can be separated by use of partial data with a high precision in a real-time fashion.

To achieve the object above, according to the present invention, there is executed the processing as follows.

First, for image data, based on a change in a density of a pixel with respect to the density of the pixels in the periphery thereof, a pattern of a character or an edge portion is extracted for each pixel, which is called an edge extraction.

In concurrence therewith, based on the density of each pixel and the average density of a plurality of neighboring pixels, the pixels to be regarded as the background of the pattern are extracted, which is called a background extraction. The pixels associated with the background here include those other than the pixels of the pattern in the binary domain.

In the background extraction, if the domain recognition is effected depending on the density data for each pixel, the result is likely to be influenced from a noise included in the density data. However, when a simple average density of a plurality of pixels is adopted, a recognition error may easily take place in the proximity of the pattern.

To solve the problem above, the result of the edge extraction described above is employed so as to omit the pixels judged to belong to the edge portion in the computation of the average density, thereby improving the precision of the background extraction.

Next, the image is subdivided into blocks each comprising relatively a large number of pixels, and based on the pixel distribution states of pixels judged to belong to the edge portion and those recognized to be contained in the background, the domain recognition is effected to determine whether each block is a binary block or a halftone block. More concretely, of the pixels in the block, a weighted sum of the number $SS_1$ of pixels judged to belong to the edge portion and the number $SS_2$ of pixels recognized to be the background is compared with a predetermined threshold level, thereby effecting the domain recognition.

Next, it is checked whether the peripheral blocks are judged to belong to the binary domain or to the halftone domain. Thereafter, depending on the state of the periphery, the halftone domain is repeatedly subjected to an expansion/contraction processing as many times as beforehand determined. The sequence of processing above is effected in a pipeline fashion, thereby achieving the object above.

The binary domain of a document can be considered to include a pattern and a background thereof. Consequently, by extracting these two regions, the image of a document can be classified into a binary domain and a halftone domain.

In addition, as already described, only a low precision is attained in the domain recognition conducted merely by using the local data. However, if the mesh area is simply increased, the processing amount becomes greater which does not remarkably contribute to an improvement of the domain recognition precision.

This problem can be solved through a hierarchic processing as follows. Namely, the local data is once referenced to effect the domain recognition for each pixel and thereafter, a global domain recognition is achieved in a unit of a relatively large block according to the result of the preceding step.

In a case of this method accomplishing a hierarchic domain recognition, the size of a mesh employed to attain a local characteristic quantity such as a density change can be determined independently of the size of a block used to effect a large scale (global) domain recognition. The block size can be determined only according to the resolution associated with the domain recognition. Generally, the peripheral area is a plain space or an unfigured space having a width of several millimeters and hence the resolution required for the domain recognition need only be below that value. Namely, the size of the block can be increased as compared with the meshes employed in the conventional examples 1 and 2. In consequence, the rewriting process can be conducted by referencing data in a wide range through a small amount of processing.

Furthermore, the problem that a halftone domain with a great density change is judged to belong to a binary domain can be solved by accomplishing a local domain recognition in which the edge extraction is combined with the background extraction.

FIG. 4a shows an example of results obtained in a case where the domain recognition is effected according to the method in which only a portion with a great density change is recognized to belong to a binary domain. In this method, as described above, the portion 10 of the pattern cannot be discriminated from the portion which is, although a halftone domain, judged to belong to a binary domain.

In contrast thereto, as the method according to the present invention, when the edge extraction is combined with the background extraction, the domain recognition result shown in FIG. 4b is obtained also through the local domain recognition.

The hatched portion is here also a portion regarded as a binary domain and the other portions are recognized to belong to a halftone domain. The portion 30 enclosed with bold frame lines belongs to a halftone domain, the portion 20 is, although actually a halftone domain, regarded as a binary domain, and the portion 15 is, although a binary domain, recognized to belong to a halftone domain.

Based on this state, the portions 20 and 15 can be omitted by rewriting small regions according to the global domain recognition.

On the other hand, the global recognition according to the present invention can be achieved by repeatedly executing in a pipeline fashion the expansion/contraction processing by referencing the state of the neighboring blocks.

In addition, when detecting the average density, the precision of the background extraction can be improved by utilizing the edge extraction result. More concretely, in the vicinity of the pattern, a line is included in a portion of a range for which the average density is to be computed. As a result, the average density is greatly changed. To overcome this difficulty, in a detection of the average density, the averaging process is achieved by omitting the pixels judged to belong to the edge portion, thereby extracting the background with a higher accuracy.

In the processing of this method, as described above, the multivalue data is necessary only in the stage of the local recognition. Consequently, the multivalue data need only be saved for the width of the range (to be referred to as a window herebelow) to be referenced in the edge extraction and the background extraction. As a result, the overall processing of the global recognition also operates in a pipeline fashion, and hence the processing can be executed only with data of a portion of an image. That is, while reading an image, the domain recognition result for each portion of the image can be obtained with a delay of a predetermined width (=Number of pixels in a block× Iteration count of global recognition).

In consequence, for example, as described above, in a case where the processing is changed over depending on the difference of the area, only a portion of the two kinds of processing results need only be saved, and hence the memory can be greatly minimized.

BRIEF DESCRIPTION OF THE DRAWINGS

The present invention will be apparent from the following detailed description taken in conjunction with the accompanying drawings in which:

FIG. 13 is a schematic diagram for explaining an example of the input/output relationships when an expansion of a halftone domain is effected;

FIG. 14 is an explanatory diagram useful to explain an example of the input/output relationship when a contraction of a halftone domain is achieved;

FIGS. 15a to 15f are diagrams showing a concrete example of the rewriting process;

DESCRIPTION OF THE PREFERRED EMBODIMENTS

Figure 1:
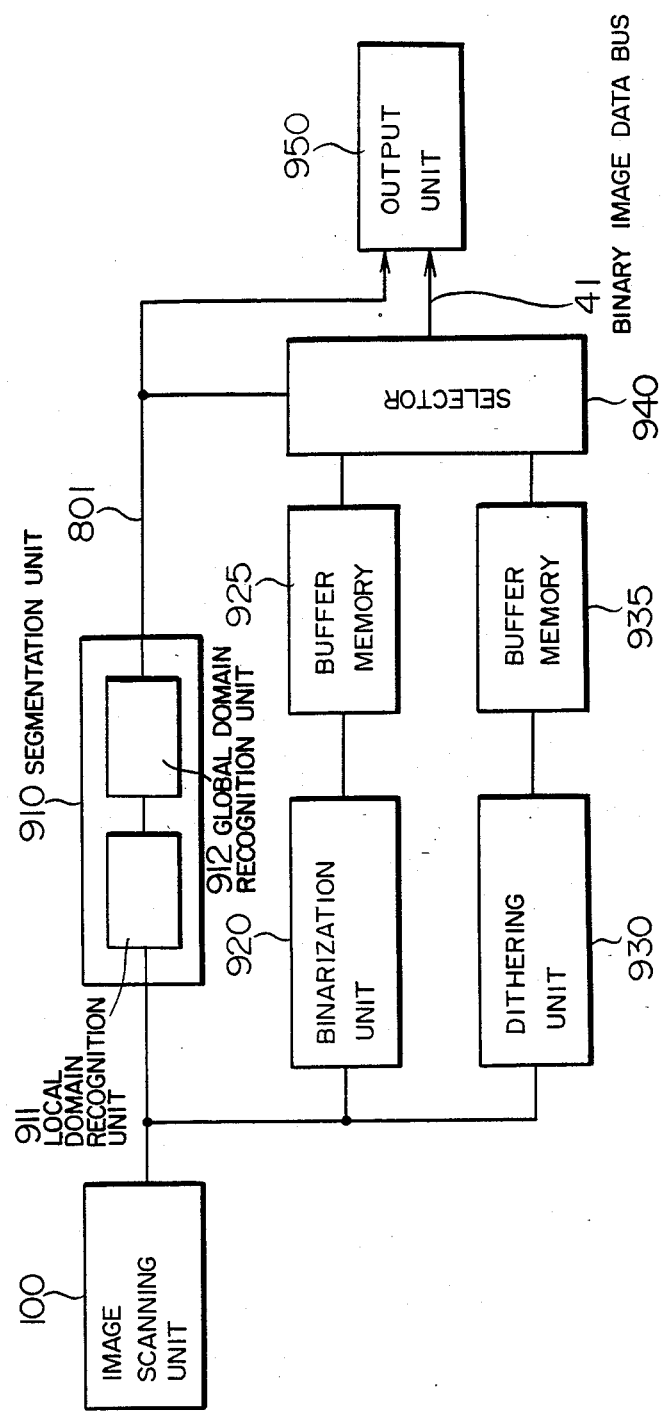
FIG. 1 is a schematic block diagram showing the overall constitution of the apparatus according to the present invention.

Referring now to FIG. 1, description will be given of an embodiment according to the present invention. The configuration of FIG. 1 includes an image scanning unit 100 which reads a document or the like by use of known means to generate multivalue digital image data, a segmentation unit 910 including local domain recognition unit 911 and global domain recognition 912 which sequentially inputs multivalue digital image data so as to effect a domain recognition by local domain recognition unit 911 and global domain recognition unit for each portion of an image, a signal line 801 for outputting a domain recognition result, a binarization unit 920 for binarizing the multivalue digital image data, a buffer memory 925 for temporarily storing the binary image data outputted from the binarization unit 920, a dithering unit 930 for executing a dithering process on the multivalue digital image data, a buffer memory 935 for temporarily storing the binary quasi-halftone data outputted from the dithering unit 930, a selector 940 for alternatively selecting the two kinds of binary images based on the domain recognition result, and an output unit 950 for outputting the obtained binary image data.

Next, the operations of the respective units will be described.

The multivalue digital image data supplied from the image scanning unit 100 is simultaneously inputted to the binarization unit 920 and the dithering unit 930. The binarization unit 920 accomplishes a binarization processing suitable for a character and a pattern on the inputted multivalue image data and then outputs the resultant binary image data. The outputted binary data is stored in the buffer memory 925. On the other hand, the dithering unit 930 achieves a dithering process to convert a halftone image such as a photograph into a binary image having a high image quality so as to deliver the attained binary data to the buffer memory 935.

In this case, two kinds of binarization results are stored in the buffer memories 925 and 935, respectively. In a case where an image of a document in which a photographic mixed, depending on the areas of an image, it is required to achieve a dithering process on a photograph area and to execute a binarization processing of a pattern for the other portions. Consequently, two kinds of binary image data respectively stored in the two buffer memories 925 and 935 are alternatively selected depending on the area of the image. This processing is effected by use of the selector 940. The selector 940 is controlled with a domain recognition signal inputted from the signal line 801. According to the present invention, the segmentation unit 910 receives the multivalue image data processes the multivalue data in the local domain recognition unit 911 and the global domain recognition unit 912 so as to output a domain recognition result for each portion of the image through a real-time processing. The operation of the segmentation unit 910 will be described in detail later in this specification.

There may occur a case where the image data necessary for the processing vary among the segmentation unit 910, the binarization unit 920, and the dithering unit 930. In such a case, the outputted binary image data does not match the domain recognition result. To overcome this difficulty, in order to establish a synchronization, the two kinds of binary image data are temporarily stored in the buffer memories.

The binary image data delivered from the selector 940 is a result obtained from an image inputted from the image scanning unit 100 by effecting a dithering process on a halftone area, for example, of a photograph or a result obtained by achieving a binarization processing for a pattern on the other areas. The outputted binary image data is fed to the output unit 950.

Since the output data is binary data, various output units designed for binary data may be connected as the output unit 950.

For displaying an output image, there is connected a high-precision display which operates in the binary mode. As compared with the ordinary display equipment for displaying a halftone density, the high-precision binary display develops a higher resolution. In addition, a pattern, for example, of a character is inherently a white/black binary image. Consequently, a highly clear display image can be attained through the binarization processing.

When outputting an image on a sheet of paper, there will be connected a printer. Most ordinary printers output only binary data. Since the data outputted from the selector 940 is a binary image and at the same time the dithering process has been effected on a photograph area, the data can be outputted from the general-purpose printer designed for binary data. In addition, such printers with a high resolution as a laser beam printer (LBP) handle only binary data for the printout in many cases and hence are not suitable for an operation to print out an image including a photograph; however, these printers can be connected as an output unit according to the present invention.

When a data file with a large capacity, for example, an optical disk is connected to this system, the optical disk can be used an automatic input apparatus for inputting image data according to the present invention.

When binarizing a document in which a photograph is included, the binarization method is required to be changed over depending on the areas. In consequence, when inputting a great volume of image data through the binarization, the domain recognization processing becomes to be a heavy load; however, according to the present invention, since the image input operation and the domain recognition are simultaneously accomplished, the processing efficiency can be improved.

In addition, when storing data, the domain recognition results obtained from the respective portions of the image can also be stored as index information. In this case, if an image processing is to be accomplished thereafter on the respective binary images thus stored, information items associated with the presence/absence and locations of photograph areas can be utilized. In consequence, there is implemented a data base configuration apparatus storing sophisticated image data.

Furthermore, description will be given of a case where a terminal of a communication line is connected as the output unit 950. In this situation, in addition to the binarization processing, an encode processing is also effected on the binary data in the binarization unit 920. On the other hand, in the dithering unit 930, a contraction processing suitable for the quasi-halftone image is achieved on the quasi-halftone image.

The encoding methods to be adopted in the binarization unit 920 include the known modified Huffman (MH) method, modified Read (MR) method, modified modified Read (MMR) method, and the like. On the other hand, when these methods are applied to the quasi-halftone image, the data amount resulted from the encoding process is increased in ordinary cases. To overcome this difficulty, a different encoding method is employed in the dithering unit 930. Based on the output from the segmentation unit 910, the selector 940 selects one of two kinds of data items inputted so as to deliver the selected data to the output unit or communication terminal 950. Receiving the data from the selector 940 and the domain recognition result from the signal line 801, the communication terminal 950 outputs, each time the recognition result changes, a code indicating an alteration of the encoding method.

In addition, according to this embodiment, the image data to be processed is a document image received through an image scanning unit; however, in practice, the present invention is applicable to any multivalue digital image data. In consequence, data beforehand stored in an image data base and data supplied via a communication line can also be processed according to the present invention.

Figure 2:
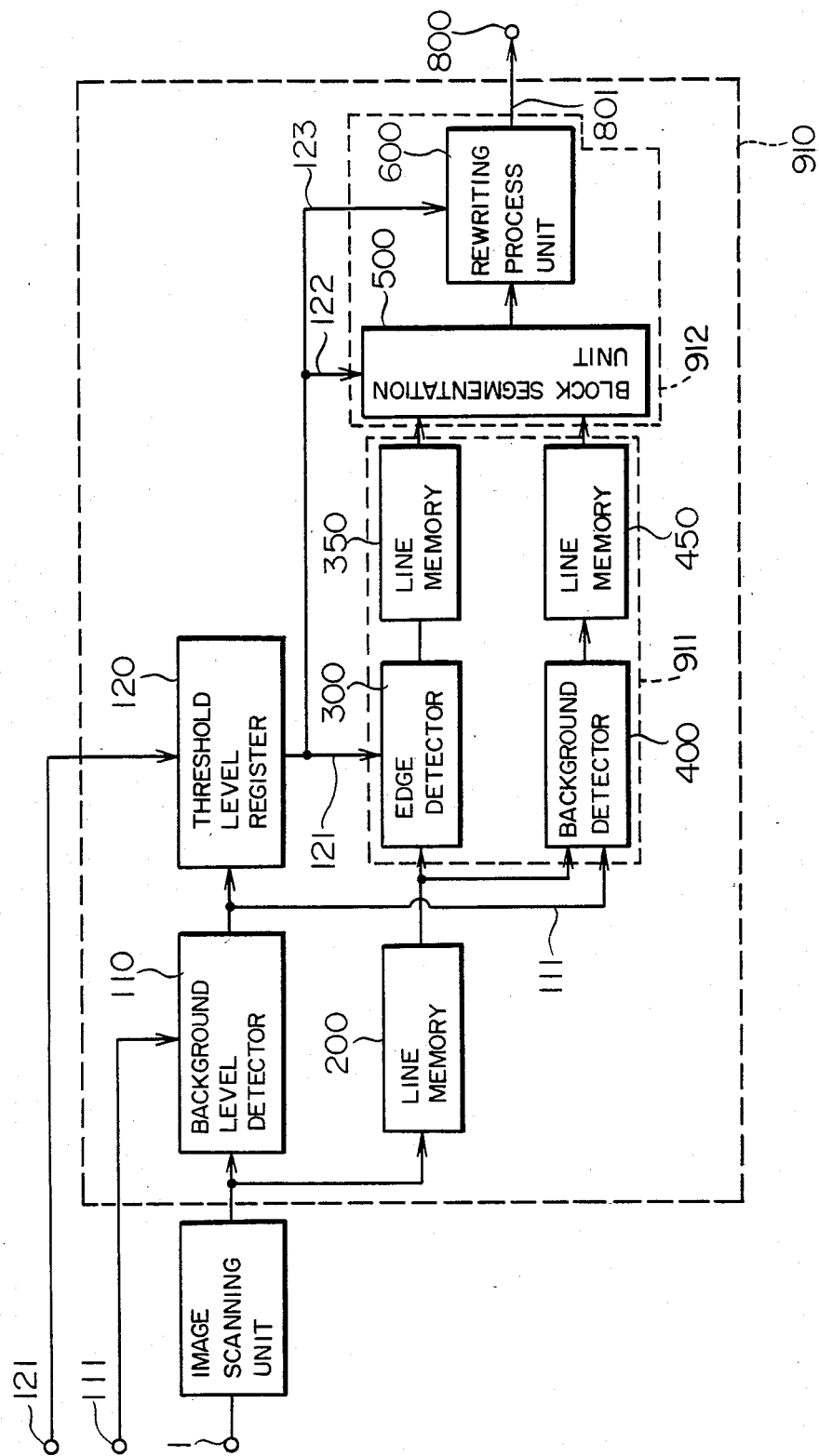
FIG. 2 is a block diagram schematically showing the internal configuration of the domain recognition unit.
Figure 3A:
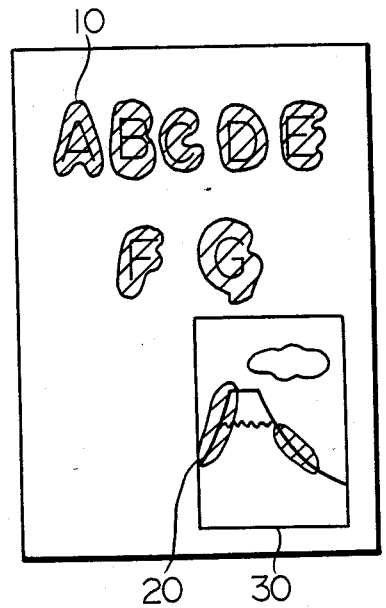
FIGS. 3a to 3c are diagrams useful to explain the problem of the conventional method.
Figure 3B:
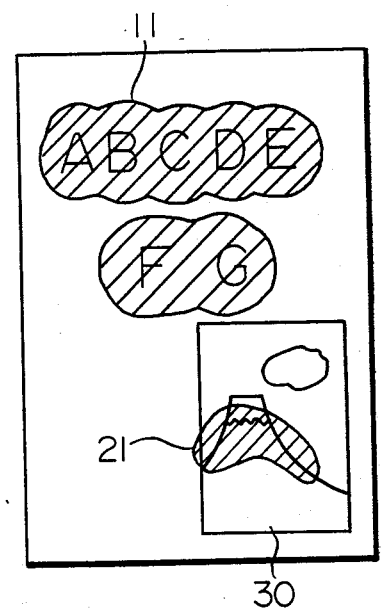
Figure 3C:
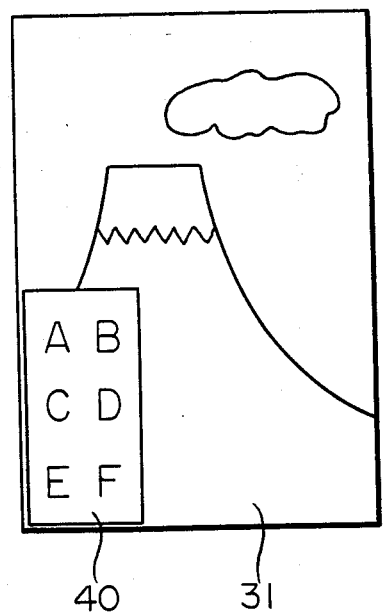
Figure 4A:
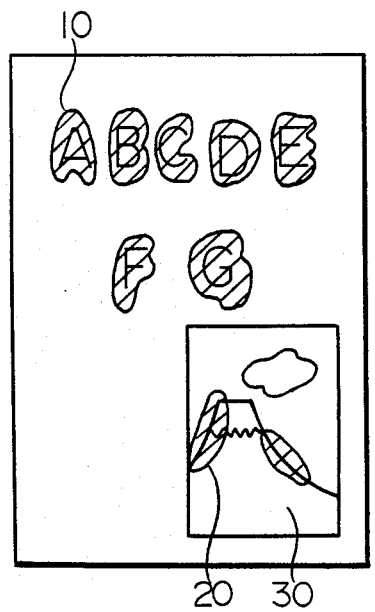
FIGS. 4a and 4b are diagrams showing an effect of the background extraction as a characteristic feature of the method according to the present invention.
Figure 4B:
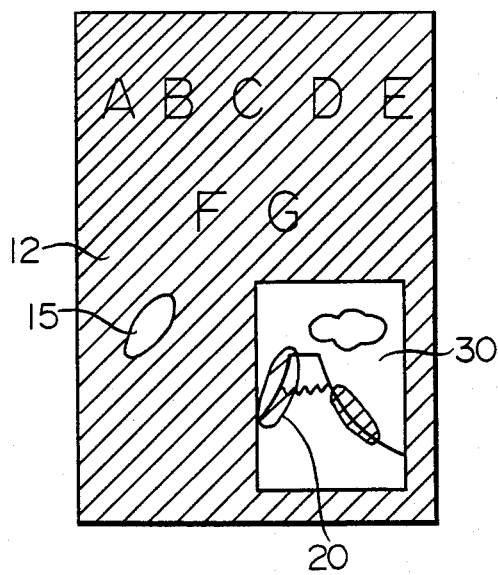

FIG. 2 is a schematic diagram showing the internal constitution of the segmentation unit 910.

The configuration of FIG. 2 includes an external image scanning unit 100 also shown in FIG. 1. In this figure, the portions enclosed with the broken lines shows the internal structures of the segmentation unit 910 the local domain recognition unit 911 and the global domain recognition unit 912 of FIG. 1. Moreover, the constitution includes a background level detector 110 to detect a background density level from image data, a threshold level register 120 to determine a threshold value at the respective processing stage according to image data or an instruction from an external device so as to indicate the determined threshold value to the respective components, a line memory 200 to temporarily store multivalue digital image data thus obtained. The local domain recognition unit 911 includes an edge detector 300 to extract, based on the data in the line memory 200, an edge portion of a pattern and the neighboring pixels, a line memory 350 to temporarily store the output from the edge detector 300, a background detector 400 to detect a background portion from the image by use of the image data in the line memory 200 and the background intensity level from the background level detector 110 and, a line memory 450 to temporarily store the output from the background detector 400. The global domain recognition unit 912 includes a block segmentation unit 500 to effect a domain recognition for each block based on the edge detection results in the line memory 350 and the background detection results in the line memory 450 and a rewriting process unit 600 to temporarily store the output from the block segmentation unit 500 so as to conduct an expansion/contraction processing on a halftone domain as many times as necessary, The segmentation unit 910 also includes an output terminal 800 to output the final domain recognition result.

The respective components of this system operate with reference to a clock signal generated from a clock pulse generator (not shown in the drawings).

Figure 5:
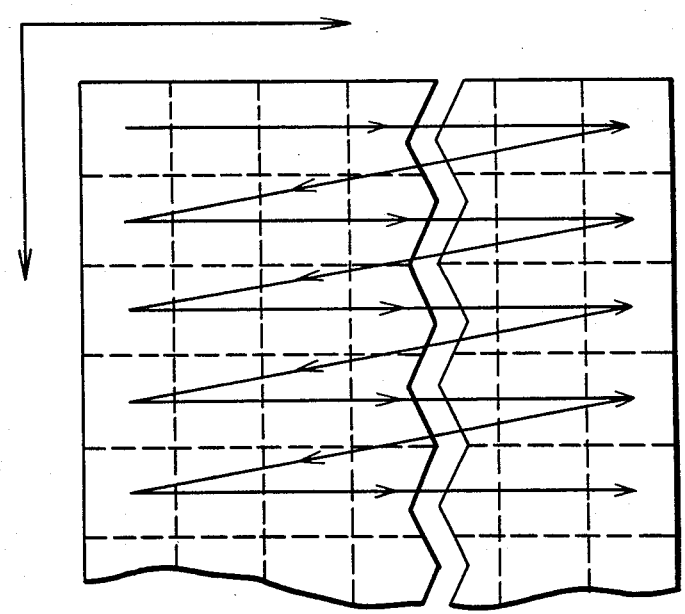
FIG. 5 is a schematic diagram showing an image reading sequence.

Data read by the image scanning unit 100 are sequentially recorded in the line memory 200. The image read operation is effected, for example, in an order indicated with the arrow marks in FIG. 5. In the diagram of FIG. 5, the horizontal direction is the primary scanning direction (associated with the raster) and the vertical direction is the secondary or auxiliary scanning direction. Small rectangles drawn with dotted lines in FIG. 5 respectively designate pixels. In this embodiment, the size of the pixel is assumed to be 1/16 mm.

Figure 6:
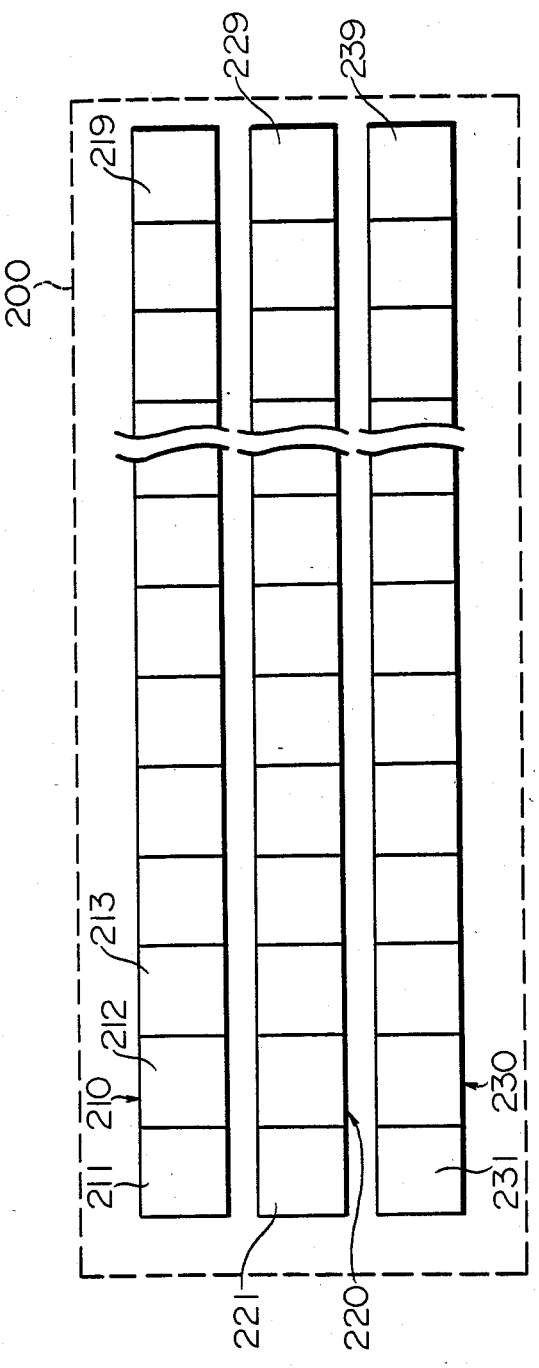
FIG. 6 is a diagram schematically showing a line memory in which the image density is temporarily stored.

FIG. 6 shows the structure of the line memory 200 in which density data of an image is to be recorded. In this figure, small rectangles (e.g. 211, 212, 213, etc.) denote memory regions corresponding to the respective pixels. The size of a line of the line memory 200 corresponds to the number of pixels contained in a primary scanning line of the image scanning unit 100. On the other hand, the line count L of the lines constituting the line memory 200 is determined according to the number of pixels in a window referenced when the edge detector 300 effects the detection on each pixel or a window employed when the background detector 400 extracts the background.

Assuming here that the size of the window adopted for the edge detection is $M_1 \times N_1$ ($M_1$=Number of pixels in the primary scanning direction of the raster and $N1$=number of pixels in a direction perpendicular to the scanning direction) and that the size of the window employed for the background detection is $M_2 \times N_2$ ($M_2$=Number of pixels associated with the raster $N_2$=number of pixels in a direction perpendicular to the raster), the line count L of the line memory 200 is represented as $$L = \begin{cases} N_1 : N_1 \geq N_2 \\ N_2 : N_1 < N_2 \end{cases}$$

where, $M_1$, $M_2$, $N_1$, and $N_2$ are integers.

The values of $N_1$ and $N_2$ are inherently independent of each other and hence may be different from each other. However, the constitution of the hardware system can be particularly simplified in a case of $N_1=N_2$. Accordingly, description will be here given of a case of $N_1=N_2=N=3$ and $M_1=M_2=M_3$. The line memory 200 sequentially records the image data sent from the image scanning unit 100 along the primary scanning direction beginning from the starting point 211 of the first line memory 210. When the data of the first line is completedly read out, the image data of the second line is obtained so as to be recorded in the second line memory 220 beginning from the first point 221. In this fashion, when the image data of three lines are recorded therein up to the final address 239 of the third line memory 230 located at the last position, the operation to record data is started again beginning from the first address 211.

Figure 7:
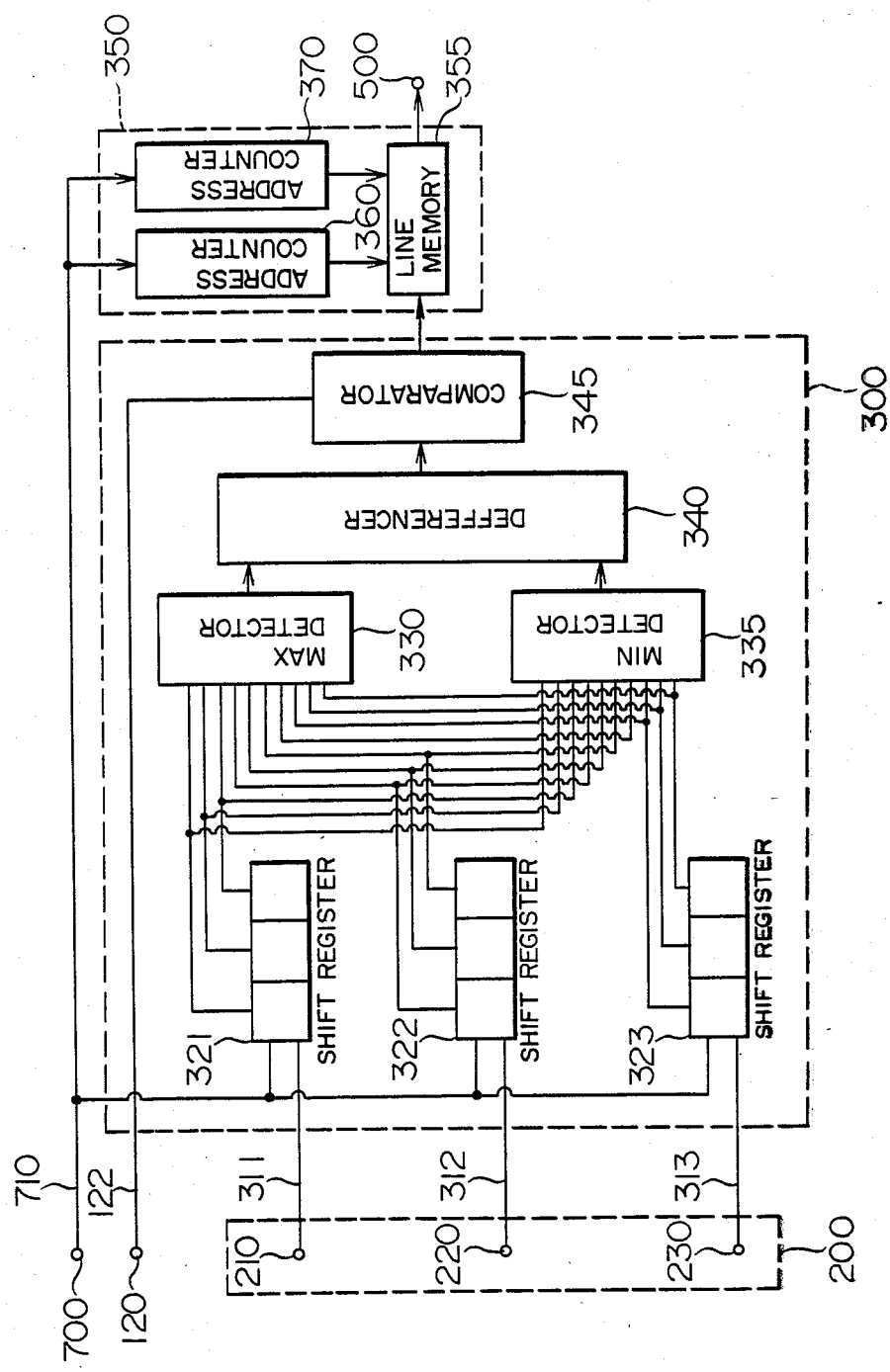
FIG. 7 is a schematic diagram showing the constitution of the edge extracting unit.

Next, description will be given in detail of the operation of the edge detection unit 300 effecting an edge detection for an image by use of the image data stored in the line memory 200. FIG. 7 shows the relationships between the constitution of the edge detection unit 300 and the line memory 350 temporarily storing therein the output from the edge detection unit 300.

As an example, an edge detection will be described in which $3 \times 3$ pixels ($M_1=3$, $N_1=3$) existing in the periphery of a pixel are assigned as a window so as to reference the density change in the window.

Actually, the same processing is possible if the number of pixels $M_1 \times N_1$ of the window is other than p $M_1=N_1=1$.

Incidentally, in a case where the variables i and j are respectively integers, in order to set a pixel at the coordinates (i, j) on an image as an objective pixel, the density data of $3 \times 3$ pixels located in the periphery of the objective pixel are required. In consequence, by this operation point, the density data D (i+1, j+1) of the pixel (i+1, J+1) in the image are required to have been obtained. That is, when the pixel at the coordinates (i, j) is read, the pixel at the coordinates (i-1, j-1) is set as an objective pixel.

Furthermore, in a case where an outer peripheral portion of an image is to be set as an objective pixel, since a portion of the window exceeds the image, there is required a particular countermeasure, which will be described later.

The edge detector 300 reads the image data via signal lines 311, 312, and 313 from the line memory 200. The signal lines 311, 312, and 313 are connected to the memories 210, 220, and 230, respectively.

In addition, from a signal line 710, a clock signal generated by the clock pulse generator 700 is inputted. When the density data D (i, j) of the pixel at the coordinates (i, j) is recorded in the line memory, the image data D (i, j), D (i, j−1), and D (i, j−2) for three pixels are inputted via the signal lines 311, 312, and 313 from the line memory 200.

The signal lines 311 to 313 are respectively connected to known data holding circuits 321 to 323 such as shift registers. Each data holding circuit or shift register keeps image data associated with three pixels previously received.

That is, when the density data D (i, j) is read out, the shift registers or data holding circuits 321 to 323 are loaded with image data D (x, Y)

x: i−2 ≦ x ≦ i (x: integer)

y: j−2 ≦ y ≦ j (y: integer) associated with $3 \times 3$ pixels centered on the pixel at the coordinates (i−1, j−1).

Next, the density data for nine pixels thus kept in the shift registers or data holding circuits 321 to 323 are respectively inputted to a maximum detector 330 and a minimum detector 335. As a result, the maximum value Dmax and the minimum value Dmin of the density data for the nine pixels are respectively supplied to a difference generator or differencer 340. In the difference generator 340, a difference between the maximum value and the minimum value is attained so as to be sent to a comparator 345. In the comparator 345, the density difference Dmax−Dmin is compared with a threshold value T1 supplied from the signal line 111 so as to produce a compare result S1. The threshold value T1 is delivered from the threshold level register 120. In the threshold level register 120, based on an instruction from an external device and an output from the background level detector 110, various threshold values to be used by the respective components of the system are generated and are delivered to the pertinent components.

Assume here that the objective pixel is located at the coordinates (x, y), then the detection result S1 (x, y) for the objective pixel is expressed as follows.

$$S1(x, Y) = \begin{cases} 1: & Dmax - Dmin \geq T1 \\ 0: & Dmax - Dmin < T1 \end{cases}$$

If the objective pixel is an edge pixel associated with the edge portion, S1 (x, y) = 1 results.

The detection result is recorded in the line memory 350, which handles data in the unit of one bit. The size of a line of memory corresponds, like the line memory 200, to the number of pixels of the image scanning unit 100 in the primary scanning direction. On the other hand, the number of lines is determined depending on the number of pixels ($P \times Q$ pixels, where P and Q are integers) for each block.

The outputs from the address counters 360 and 370 are respectively set to values associated with the coordinates (x, y) of the objective pixel.

Through the processing above, while reading an image, the edge detection result can be recorded with a delay of one line in the line memory.

In a case where the objective pixel belongs to an outer peripheral portion of an image, a portion of the window exceeds the image in some cases, which require a particular processing. As an example, it is assumed here that the detection result S1 of the outer peripheral portion of the image is unconditionally one. Alternatively, it is also possible to virtually record data with a particular value on the outside with respect to the actual image data.

Figure 8:
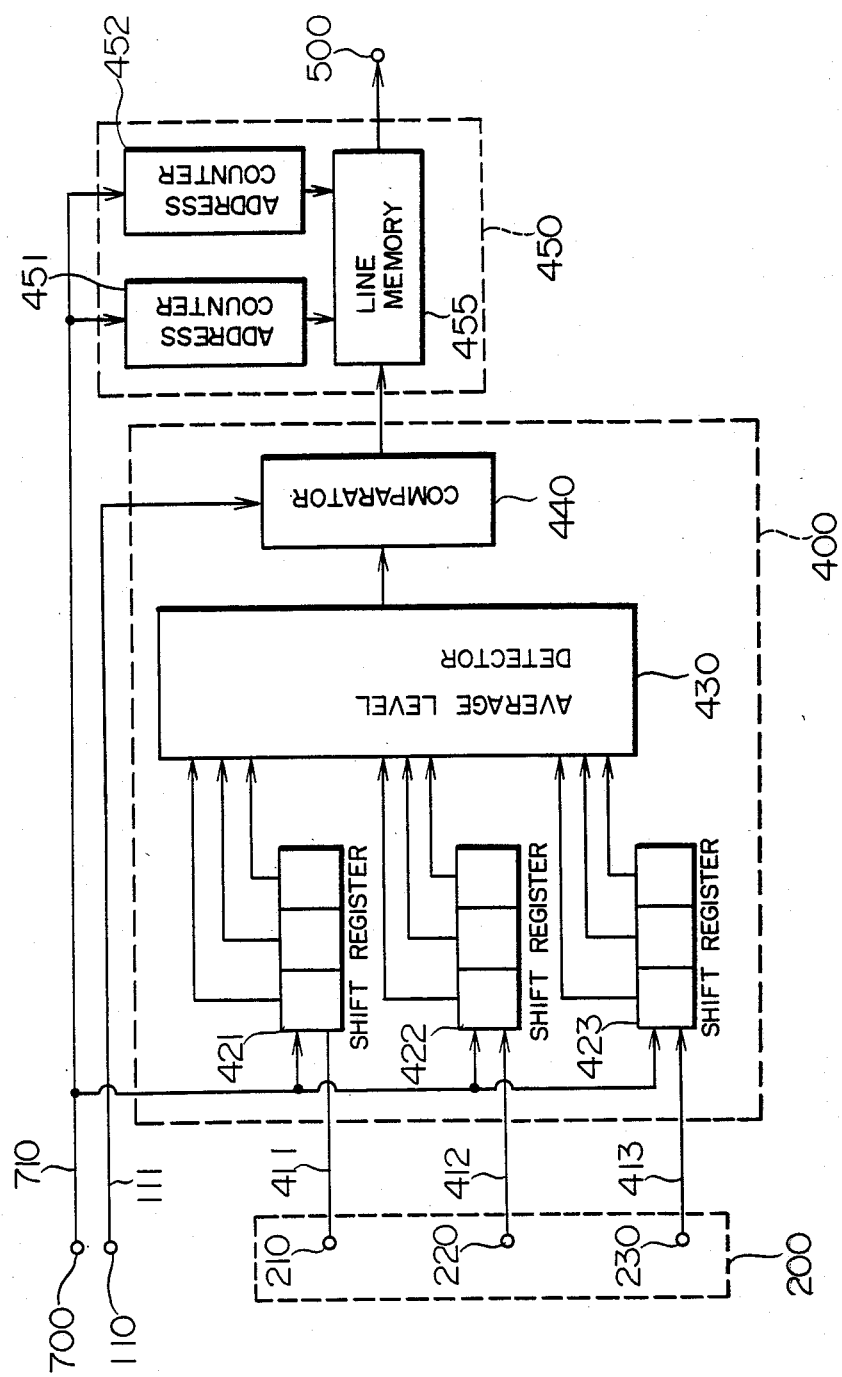
FIG. 8 is a diagram illustrating the configuration of the background extract unit.

Next, description will be given in detail of the operation of the background detector 400. FIG. 8 shows the relationships between the constitution of the edge detector 300 and the line memory 450 temporarily storing the output from the edge detector 300.

For the background detection, like the edge detection, a window is assigned, centered on an objective pixel, such that the detection is effected according to the average density attained from the window.

As an example, description will be here given of a case where the size of the window is represented as $3 \times 3$ pixels.

In practice, the window size ($M_2 \times N_2$) can be set to an arbitrary value. However, as described above, the configuration is simplified when the window size matches with the reference range of the edge detector 300. Also in the background detector 400, the image data read operation is effected in the similar fashion to that of the edge detector 300. First, the density data area read via signal lines 411 to 413 from three line memories 210, 220, 230, respectively. The shift registers or data holding circuits 421 to 423 respectively keep image data of three pixels previously received. The clock signal from the clock pulse generator 700 is inputted via the signal line 710.

When the density data D (i, j) is inputted to the line memory, the shift registers 421 to 423 are loaded with density data of $3 \times 3$ pixels centered on the pixel at the coordinates (i−1, j−1).

Assume here also, like the case of the edge detector 300, the objective pixel is assumed to be located at the coordinates (x, y).

The average level detector 430 detects the average density value B (x, y) for the nine pixels and sends the resultant value to the comparator 440. In the comparator 440, the average density value B (x, y) thus received is compared with a background density T2 supplied via the signal line 111 so as to output a detection result S2 (x, y). The background density is detected by the background level detector 110. The background detector 400 includes a function to determine a density of a background of the respective document based on the density data inputted immediately after the document is read or an instruction from an external device.

The detection result S2 (x, y) is expressed as follows.

$$S2(x, y) = \begin{cases} 1: & B(x, y) \geq T2 \\ 0: & B(x, y) < T2 \end{cases}$$

Here, S2 (x, y) is the background detection result for the objective pixel at the coordinates (x, y), and if the objective pixel belongs to the background, S2 (x, y)=1 results.

Next, the detection result S2 is recorded in the line memory 450. The constitution of the line memory 450 is the same as that of the line memory of the edge detector 300.

In the background detection, as described above, there is employed the average density of a plurality of pixels in a window. Consequently, in a case where a portion of a line is included in the window, for example, in the proximity of a character, the average density is greatly changed.

Figure 9:
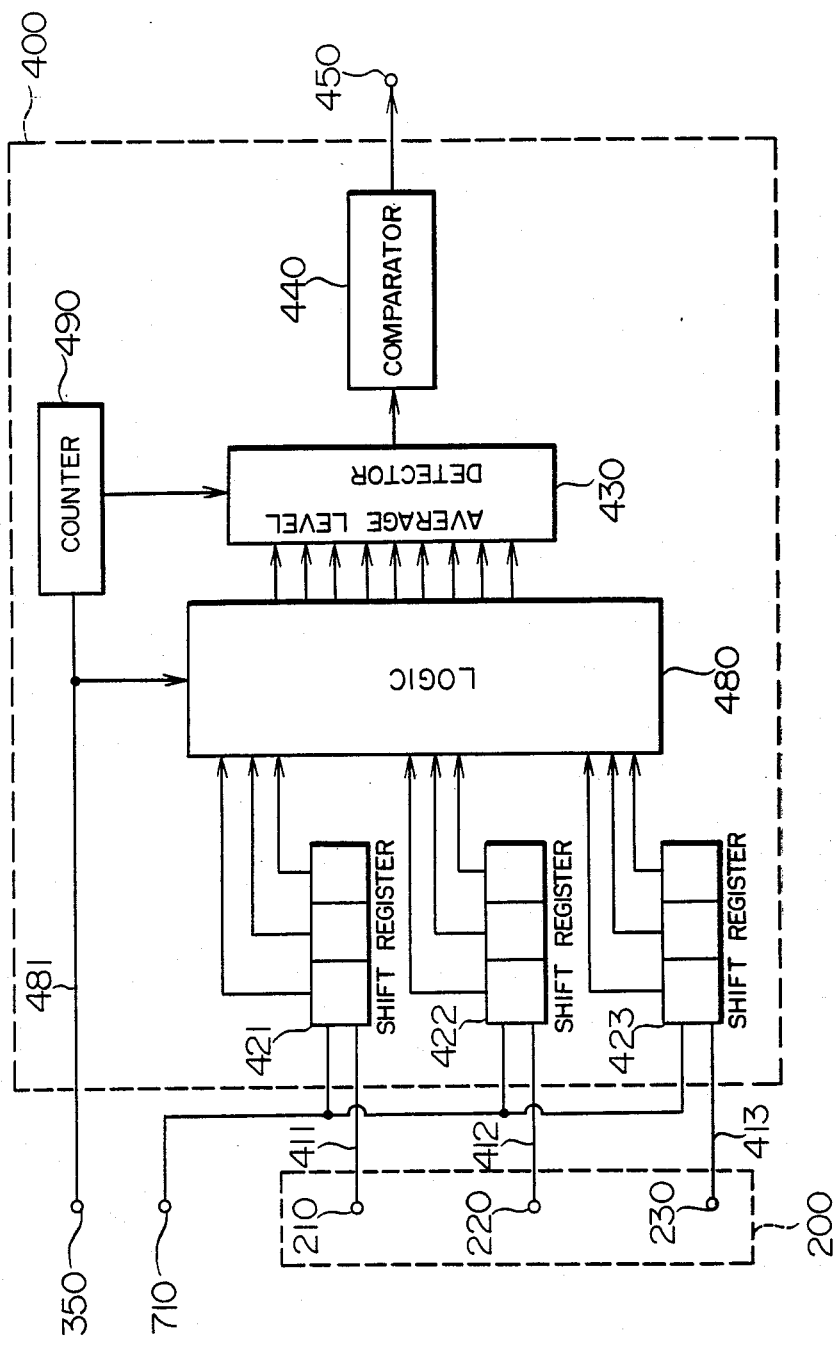
FIG. 9 is a diagram schematically showing an example of the background extract unit.

FIG. 9 shows an example of a circuit in which the countermeasure is included.

According to the method, the edge detection result is used to overcome the difficulty. When an image at coordinates (i, j) is received, the edge detection result is attained only up to the pixel at coordinates (i−1, j−1). Consequently, the line memory 200 is modified such that the data registers 421 to 423 are loaded with the corresponding image data D (x, y)

$x: i-3 \leq x \leq i-1$ $y: j-3 \leq y \leq j-1$

A logic gate 480 is disposed at an intermediate point between the data registers 421 to 423 and the average level detector 430. The logic gate 480 is supplied, together with the density data, with the edge detection result S1 (x, y)

$x: i-3 \leq x \leq i-1$ $y: j-3 \leq y \leq j-1$ via the signal line 481.

The density data of a pixel (S1 (x, y)=1) assumed to be an edge pixel in the edge detector 300 is delivered as 0 to the average level detector 430.

In addition, the number of edge pixels of each window is counted by the counter 490 so as to be inputted to the average level detector 430. In the average level detector 430, through this processing, an average density can be attained for the pixels of the window excepting the edge pixels.

The background detection result is recorded in the line memory 450 in the similar fashion to that described above.

Next, description will be given in detail of the block segmentation unit 500 which effects a domain recognition for each block based on the edge detection result in the line memory 350 and the background detection result in the line memory 450.

Figure 10:
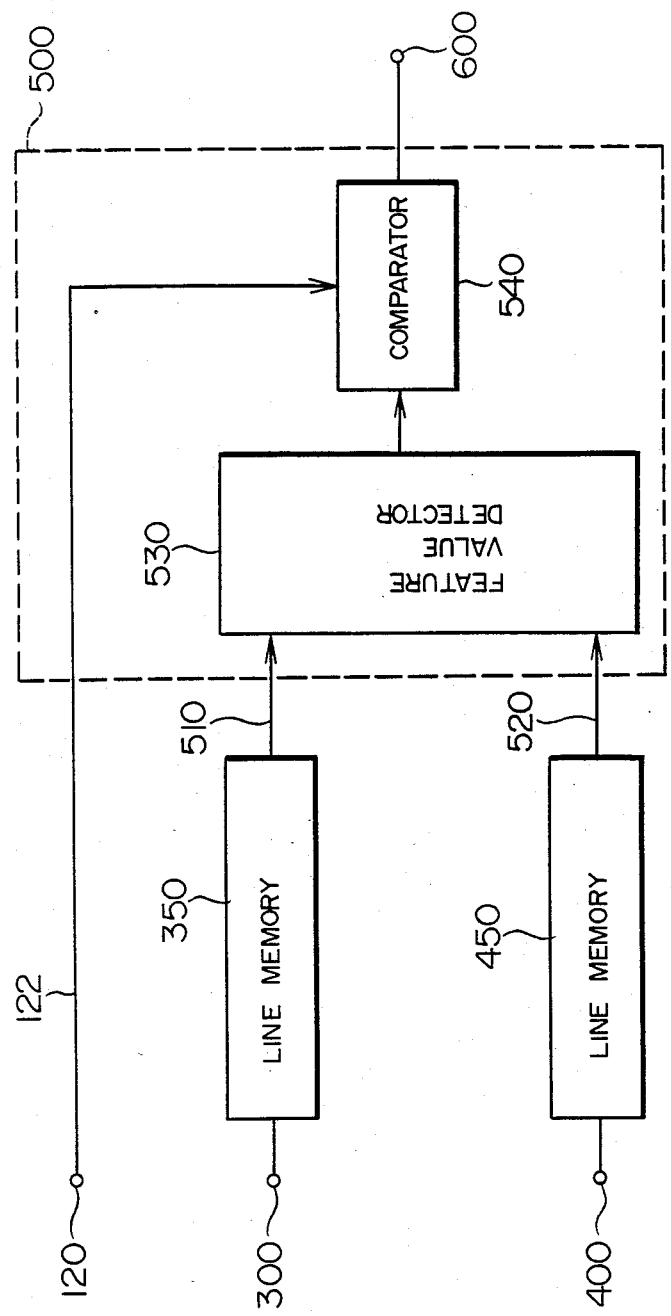
FIG. 10 is a schematic diagram showing the configuration of the block recognize section.

FIG. 10 shows the configuration of the peripheral components of the block segmentation unit 500. The block segmentation unit 500 of FIG. 1 comprises a feature value detector 530 and a comparator 540.

A block is constituted with P X Q pixels (P and Q are integers).

As an example, there is shown a case of P=Q=16.

The block size of this block corresponds to the resolution of the domain recognition method according to the present invention. Data attained as the edge detection result in the line memory 350 is subdivided into blocks, which are read out therefrom in a block-by-block fashion so as to be delivered via a signal line 510 into the feature value detector 530. In addition, the background detection result is similarly delivered from the line memory 450 via a signal line 520 to the feature value detector 530.

In the feature value detector 530, based on the received data, a feature quantity or value U for each block is produced. Incidentally, the coordinates of a block which contains the pixels at coordinates (i, j) will be represented as (I, J) hereafter.

Here, I and J are respectively integers satisfying the following expressions.

$i = I \times 16 + k_1 \ (0 \leq k_1 \leq 15)$ $j = J \times 16 + k_2 \ (0 \leq k_2 \leq 15)$ where, $k_1$ and $k_2$ are integers.

Next, description will be given of an example of the feature value detection.

Assume here that the density data D (i, j) of the pixel at coordinates (i, j) has been received, then the edge detection result S1 and the background detection result are, as described above, attained up to the pixels at coordinates (i−1, j−1) and i−2, j−2), respectively. In this situation, S1 (x, y) and S2 (x, y) in the following range are inputted to the feature value detector 530.

$x: i-17 \leq x \leq i-2$ $y: j-17 \leq y \leq j-2$

Assume here the coordinates of the block containing the pixels in this range are represented as (X, Y).

X: 1+x/16 (X is an integer)

Y: 1+y/16 (Y is an integer)

Under this condition, the feature value U (X, Y) of the block is computed from the following expression.

$U(X, Y) = \alpha \times SS1 + \beta \times SS2$ ($\alpha$ and $\beta$ are coefficients)

-continued
$$SS1 = \sum_{y=j-17}^{j-2} \cdot \sum_{x=i-17}^{i-2} S1(x, y)$$

$$SS2 = \sum_{y=j-17}^{j-2} \cdot \sum_{x=i-17}^{i-2} S2(x, y)$$

In the simplest case, $\alpha=\beta 1$ holds. The feature value U (X, Y) is delivered from the feature value detector 530 to the comparator 540. In the comparator 540 (U (X, Y), the feature value U (X, Y) is compared with a threshold value T3 received via the signal line 122 from the threshold level register 120, thereby producing a domain recognition result V (X, Y) depending on the result of the comparison as follows.

$$V(X, Y) = \begin{cases} 1: & U(x, Y) \geq T3 \\ 0: & U(X, Y) < T3 \end{cases}$$

In a case where the block at the coordinates (X, Y) is determined to belong to a binary domain V (X, Y)=1 results.

Through this processing, while reading an image, the domain recognition result can be attained for each block with a delay of the maximum of 32 lines.

Next, description will be given in detail of the rewriting process unit 620 in which the output from the block segmentation unit 500 is temporarily stored so as to effect the expansion/contraction of the halftone domain, thereby obtaining the final domain recognition result.

Figure 11:
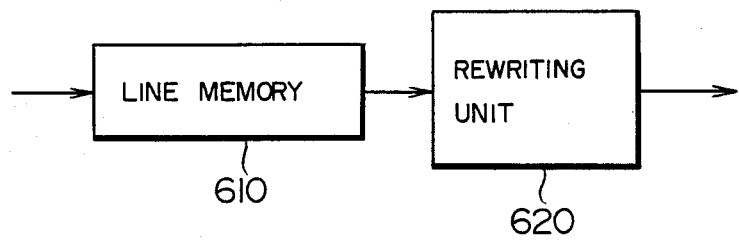
FIG. 11 is a diagram showing an example of the rewriting process unit.

In the rewriting process unit 620, a rewriting process is repeatedly effected a plurality of times in a pipeline fashion so as to effect the expansion/contraction of the halftone domain. FIG. 11 shows the basic constitution of the portion which accomplishes the rewriting process at the respective stages.

The output from the preceding stage is saved in the line memory 610. The size of a line of the line memory 610 corresponds to the number of blocks located in the primary scanning direction. In the rewriting unit 620, the operation or judgement results for the peripheral blocks are checked for each block so as to rewrite the central block depending on the result of the check. The output from the rewriting unit 620 is written in a line memory disposed at the next stage. Incidentally, a processing portion of each stage is called a unit hereafter, and data written in a line memory at the stage H and the output therefrom are represented as E (H) and F (H), respectively.

In the line memory of the processing unit at the stage 1, there is recorded the output V (X, Y) from the block segmentation unit 500. Consequently, E(1) (X, Y)=V (X, Y) holds.

Figure 12:
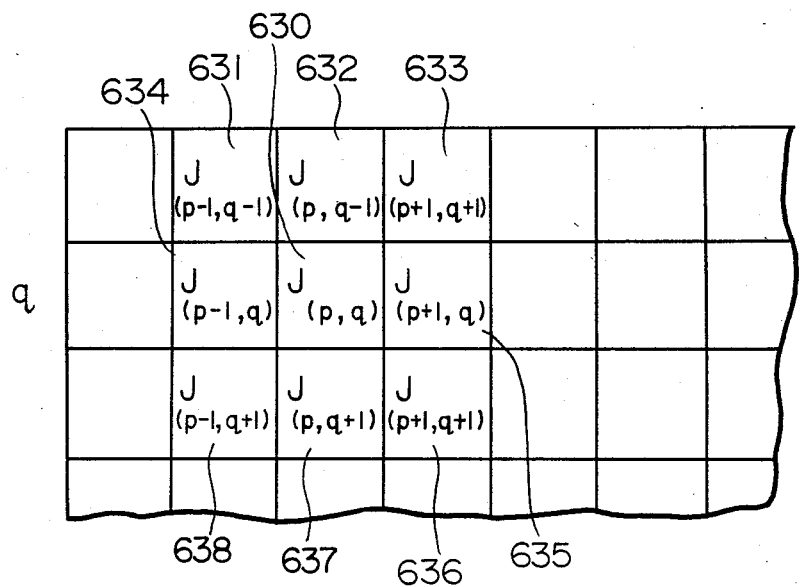
FIG. 12 is a schematic diagram showing a state of data in a line memory of the rewriting process unit.

Next, an example of the processing method will be described with reference to a case of the expansion of a halftone domain. FIG. 12 shows an arrangement of data stored in the line memory in which reference numerals 631 to 636 respectively indicate pixels to be referenced in the respective processing. Let us consider a case where the block 630 at coordinates (X, Y) is to be processed. First, according to the method as described above, the recognition or judgement results obtained up to this point for the objective block 630 and eight neighboring blocks 631 to 638 are read from the corresponding line memories as follows.

$E(H)$ $(X-1, Y-1), E(H)(X, Y-1),$
$E(H)(X+1)(Y-1),$
$E(H)$ $(X-1), Y), E(H)(X+1, Y),$
$E(H)$ $(X-1, Y+1), E(H)(X, Y+1),$
$E(H)$ $(X+1, Y+1)$

If, E (H) (X, Y) results, the objective block has been judged to belong to the halftone block, and hence the output F (H) (X, Y) is set to 0.

On the other hand, in a case of E (H) (X, Y) =1, the value of F (H) (X, Y) is determined depending on the states of the peripheral blocks. The processing above is called an expansion processing of the halftone domain herebelow.

As a concrete example of the expansion processing of the halftone domain, FIG. 13 shows an example of relationships between E (H) and F (H).

According to the method of the example of FIG. 13, the objective block 630 of FIG. 12 is judged depending on the states of neighboring blocks 632, 634, 635, and 637 located at positions in the respective four directions with respect to the objective block. FIGS. 15a to 15f are diagrams showing concrete conditions employed in this method. FIG. 15 shows a case where the four adjacent blocks of the objective block do not include a halftone block. FIGS. 15b to 15f show cases where the number of halftone blocks included in the four adjacent or neighboring blocks is 1, 2, 2, 3, and 4, respectively. In addition, FIGS. 15c and 15d show the difference in the connecting configuration of the halftone blocks. For the rewriting process on FIG. 13, F (H) (X, Y)=0 is assumed in the cases of FIGS. 15a to 15c, whereas F (H) (X, Y)=E (H) (X, Y) is assumed in the cases of FIGS. 15e and 15f.

When using the conditions above, even when an arbitrary number of expansion processing is repeatedly effected on a halftone domain, the halftone domain is not expanded to exceed the outer rectangle circumscribing the original area.

In consequence, it can be prevented that an inherent binary domain which has been recognized to be a halftone domain up to this point is expanded without limitation or without concatenation.

Through repeatedly effecting the expansion processing of the halftone block, the rewriting process can be accomplished on a quite small binary area. In consequence, even there exists, for example, a portion with a high contrast in a photograph area, the domain recognition can be appropriately achieved.

FIG. 16 shows a process in which the halftone domain expansion is repeatedly accomplished to expand the halftone domain.

This diagram shows a case where the domain expansion is effected two times.

A small rectangle of FIG. 16 indicates each block.

Reference numerals 660 and 670 denote inherent halftone domains which have been by mistake regarded as binary domains so far; whereas reference numerals 680 and 690 indicate inherent binary domains which have been mistakenly recognized to be halftone domains up to this point, and reference numeral 650 designates a portion appropriately judged to be a halftone domain.

Figure 16A:
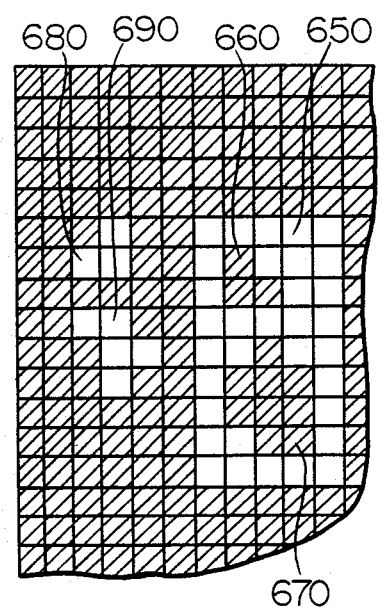
FIGS. 16a to 16c are diagrams showing an effect resulting from the execution of the expansion of the halftone domain.
Figure 16B:
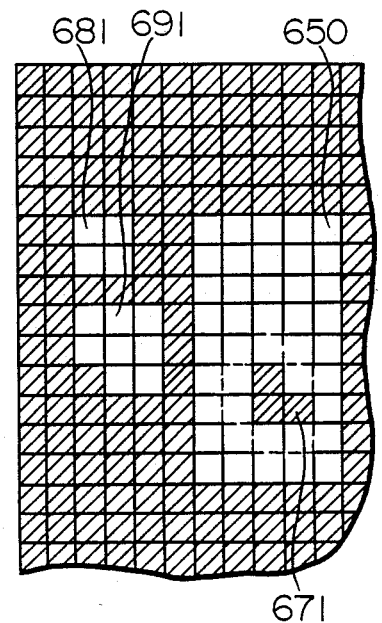

FIG. 16b shows a result attained by effecting once the halftone domain expansion on the initial conditions of the area (FIG. 16a). The portion 660 mistakenly regarded as a binary domain is now correctly judged to belong to a halftone domain, and the area 670 is contracted to an area 671. On the other hand, reference numeral 681 of FIG. 16b indicates the result attained by expanding the portion 680 mistakenly judged to be a halftone domain before.

Figure 16C:
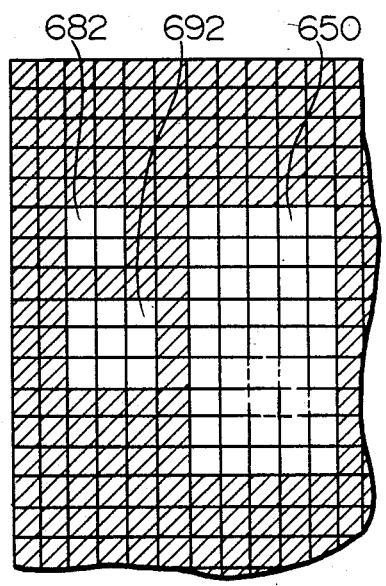

In addition, FIG. 16c shows the result obtained by effecting the halftone domain expansion again. The area 671 is also removed and the halftone domain 630 is appropriately recognized. In FIG. 16c, reference numerals 682 and 692 denote the results attained by executing two times the expansion processing on the portion mistakenly judged to be a halftone domain before.

On the other hand, the areas 680 and 690 which have been mistakenly regarded as halftone domains are transformed into the areas 681 and 691, respectively through the first expansion processing; thereafter, the second expansion processing is achieved thereon to attain the areas 682 and 692. However, neither the area 682 nor the area 692 is expanded to exceed the circumscribing rectangle of the area 680 or 690 in the initial state (FIG. 16a).

After the expansion of the halftone domain is repeatedly accomplished as many times as required, the contraction processing (expansion of the binary domains) is to be effected.

The processing procedure of the contraction is the same as that of the expansion excepting the rewrite conditions. FIG. 14 shows the rewrite conditions.

Through processing the conditions of FIG. 14, the rewriting process is conducted on the inherent binary portions which have been mistakenly recognized to be halftone domains.

The expansion processing of the halftone domain and the contraction thereof are respectively effected at least once or several times, thereby achieving a global or large scale domain recognition.

In the contraction of the halftone domain, in addition to a rewriting process of the quite small halftone domain, corner portions of, for example, a photograph are also subjected to the rewriting process. Consequently, in the final processing step, the halftone domain is again expanded so as to reconstitute the boundaries of the domains.

Figure 17:
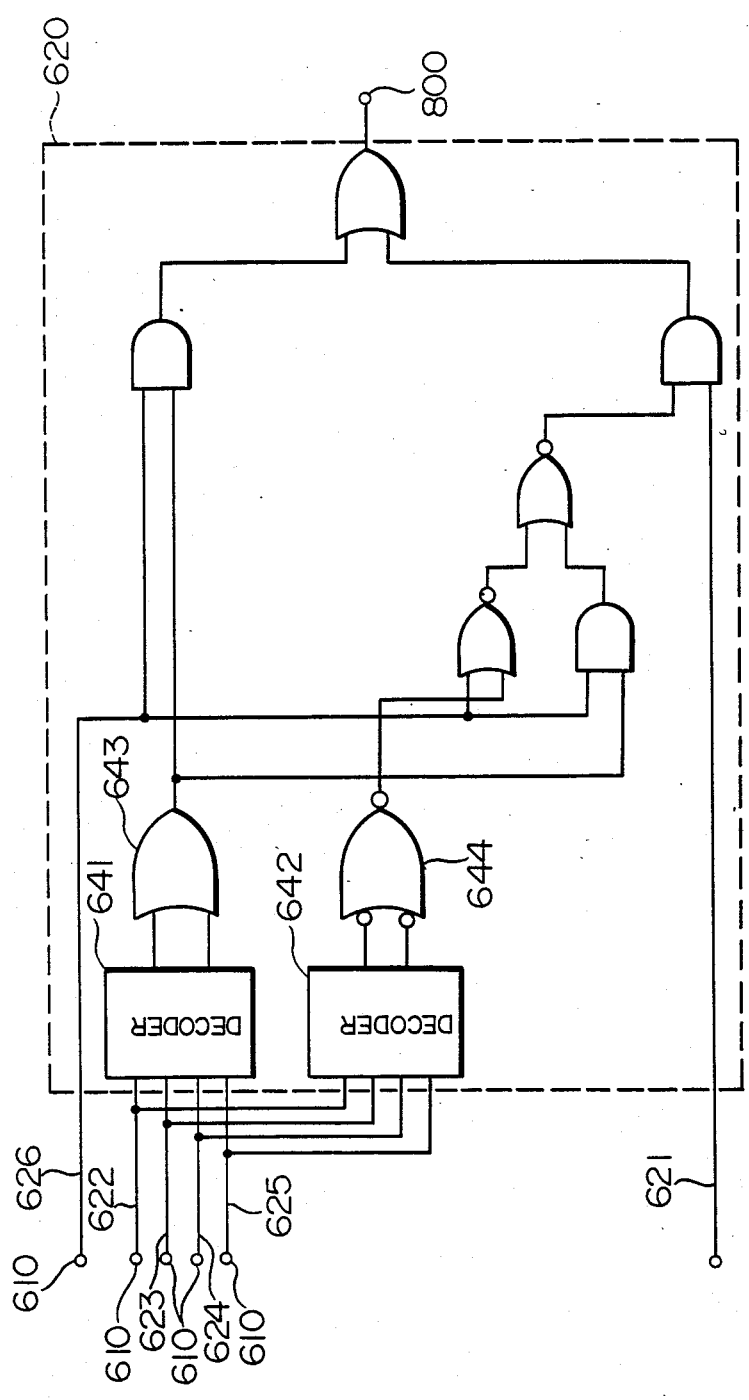
FIG. 17 is a schematic diagram showing an example of a circuit configuration for the rewriting process.

FIG. 17 shows a circuit configuration effecting the expansion/contraction processing above. Via signal lines 621 to 625, there are inputted, E (H) (X, Y), E (H) (X−1, Y), E (H) (X+1, Y), E (H) (X, Y−1), and E (H) (X, Y+1), respectively.

The signal supplied via a signal line 626 is a control signal to control the change-over between the expansion and the contraction.

Incidentally, reference numerals 641 and 642 designate decoders which connect only particular output lines to gates 643 and 644, respectively. In addition, it is also possible to employ a memory having the contents of FIGS. 13 and 14 by using E (H) (X, Y), E (H) (X−1, Y), E (H) (X+1, Y), (E (H) (X, Y−1), E (H) (X, Y+1), and FLG as address lines.

Through the processing above, an image can be separated into a binary domain and a halftone domain with the resolution corresponding to the size of each block.

In consequence, there arises a fear that a pixel in the priximity of a boundary of the domain is mistakenly recognized to be a different domain.

To avoid this disadvantage, at the final processing stage, the halftone domain is unconditionally expanded or contracted by a block. Whether the expansion or the contraction is used depends on the purpose of the area separation. For example, the expansion processing is suitable for the change-over of the binarization method.

When the processing above is finished, there is attained the final result of the domain recognition. The final domain recognition result is delivered from an output terminal 800.

According to this embodiment, while reading an image, each portion of the image can be subjected to the domain recognition to determine whether the portion belongs to the binary domain or the halftone domain with a high precision.

As described above, according to the present invention, also for a document including characters written by a pencil and a photograph having portions with a high contrast, while reading the document, the binary domains associated with the characters and the like can be separated from the halftone domains of the photograph and the like in real-time processing with a high precision.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

We claim:

1. An image input apparatus comprising:
   an image scanning unit for effecting a scanning on a surface of a sheet of paper to convert an optical image on the sheet into halftone or multivalue digital image data;
   a local recognition unit for effecting a scanning on an image attained by said image scanning unit by use of a window including M×N (M and N are integers) pixels such that a feature value is extracted depending on a state of a density distribution of pixels in the window and a recognition to determine whether each of said pixels belongs to a binary domain or a halftone domain is effected according to said feature value; and
   a large scale recognition unit for subdividing the image in block each including P×Q (P and Q are integers and P>M, Q>N) pixels such that depending on a feature value represented by an output result from said local recognition unit with respect to each pixel of each block, whether said each block belongs to a binary domain or a halftone domain is recognized in a real-time processing;
   wherein recognition of whether each portion of said image belongs to a binary domain or halftone domain is effected only depending on partial data of said image.

2. An image input apparatus according to claim 1 wherein said large scale recognition unit comprises:
   a block segmentation unit for determining a feature value for each block depending on a result of a local recognition on pixels of said each block so as to determine whether said block belongs to a binary domain or a halftone domain according to said feature value; and
   a rewriting unit for detecting a state of a result from said block segmentation unit with respect to blocks located in peripheral positions of said each block such that when the result satisfies a particular condition, a processing to rewrite the result associated with a central block is repeatedly effected a plurality of times in a pipeline manner.

3. An image input apparatus according to claim 2 wherein said large scale recognition unit comprises as a final stage of the large scale recognition:
a processing in which a state of recognition result for at least a block adjacent to each said block is detected such that when at least a halftone block exists therein, said central block is recognized to be a halftone domain.

4. An image input apparatus according to claim 2 wherein said rewrite processing for said central block comprises:
two kinds of processing including a processing to be executed only when said central block is recognized to be a binary domain and a processing to be executed only when said central block is recognized to be a halftone domain;
said two kinds of processing are respectively executed once or a plurality of times and a combination of said two kinds of processing is executed at least once; and
only when said central block is recognized to be a halftone domain as a result, a processing to effect a rewriting only when said central block is a binary domain is executed once or a plurality of times.

5. An image input apparatus according to claim 2 further comprising
a rewriting unit for referencing, in a case where a recognition result of neighboring blocks of said central block is to be referenced, a recognition result of at least four blocks adjacent thereto in horizontal and vertical directions of said central block and for effecting the processing to rewrite the recognition result of said central block only when the recognition result of three or four blocks of said four blocks or the recognition result of two blocks thereof orthogonal to each other is different from the recognition result of said central block.

6. An image input apparatus according to claim 1 wherein said local recognition unit possesses at least two kinds of judging methods associated with a background detect unit for extracting at least a background of an image.

7. An image input apparatus according to claim 6 wherein said local recognition unit includes as part thereof an edge detect unit and a background detect unit for effecting a feature detection by use of an output from said edge detect unit.

8. An image input apparatus according to claim 7 wherein said background detect unit includes a background density detect unit for determining a threshold value based on image information inputted or an instruction supplied from an external device.

9. An image input apparatus comprising:
(a) means for inputting an image and for converting the image into halftone or multivalue digital image data;
(b) binarize means for binarizing said halftone digital image data;
(c) dither means for converting said halftone digital image data into guasi-halftone data;
(d) domain recognize means for determining whether said halftone digital image data belongs to a binary domain or to a halftone domain; and
(e) select means for selecting either an output from said binarize means or an output from said dither means based on are result from said domain recognize means wherein said domain recognize means includes:
(i) means for processing said halftone digital image data so as to extract an edge portion of the image for each pixel,
(ii) means for extracting pixels associated with a background of the image other than the edge portion of the image based on a density of each pixel or an average density for each group of a plurality of adjacent or neighboring pixels, and
(iii) means for subdividing said image data into a plurality of blocks each including a predeterned number of pixels such that a domain recognition is effected for each said block to determine whether said each block belongs to a binary block or a halftone block based on distribution states of pixels of said block judged to belong to the edge and pixels of said block judged to belong to the background.

10. An image input apparatus comprising:
means for inputting an image including a character or a pattern area and a photographic area and for converting said image into multivalue digital image data;
binarize means for binarization processing of a binary image such as a character and a pattern for said inputted multivalue image data;
dither means for dithering processing of a halftone image such as a photographic for said inputted multivalue image data;
local domain decision means for deciding whether a pixel corresponding to said multivalue digital data belongs to a binary image domain or to a halftone image domain based on detecting the condition of density distribution of pixels in a predetermined range located in a periphery of said pixel;
global domain decision means including block decision means for deciding whether a block consisting of an adjacent plurality of said pixel belongs to a binary image domain or to a halftone image domain based on decision results for each pixel generated by said local domain decision means and rewriting means for correcting the decision results of a block decision results of blocks adjacent to said block according to a predetermined rule;
selection means for alternatively selecting data generated by said binarize means or said dither means according to the decision results for each block generated by said global domain decision means.

11. An image input apparatus accoring to claim 10, wherein said binarize means are plural and a size of a block employed in said block decision means is determined by a resolution of domain recognition required in exchanging said binarize means.

12. An image input apparatus according to claim 10, wherein said rewriting means comprises:
means for deciding that all of said blocks adjacent to said block, which has been decided to belong to a halftone image domain, belong to said halftone image domain.

13. An image input rewriting apparatus according to claim 10, wherein said rewriting means comprises:
means for detecting an output from said block decision means as a distribution pattern of decision results of said blocks adjacent to said block, and repeating means for repeating processings of at least once of rewriting decision results for a central block as a halftone image domain if said central block is decided to belong to a binary image domain and a detected distribution pattern satisfies a prescribed specific condition and at least once rewriting said decision results for said central block as a binary image domain if said central block is decided to belong to a halftone image domain and said detected distribution pattern satisfies a prescribed specific condition.

14. An image input apparatus according to claim 13, wherein said repeating means repeatedly performs processings of rewriting when said central block is decided to belong to a binary image domain and when said central block is decided to belong to a halftone image domain and the former rewriting processing is performed after the latter rewriting processing.

15. An image input apparatus according to claim 10, wherein said local decision means comprises:
   edge extraction means for detecting for each pixel a maximum value (Dmax) and a minimum value (Dmin) of a density in each pixel and pixels in a predetermined range located in a periphery of said each pixel, and deciding that said each pixel is an edge pixel of a character or a pattern if a difference between Dmax and Dmin is not less than a prescribed first threshold value; and
   background extraction means for calculating for each pixel an average value of each pixel and pixels in a periphery of said each pixel and deciding that said each pixel is a background pixel if the average value is not less than a prescribed second threshold.

16. An image input apparatus according to claim 15, wherein if said each pixel and pixels in a predetermined range located in the periphery thereof, said background extraction means performs a processing of pixels other than said edge pixel.

* * * * *